United States Patent
Eichler et al.

(10) Patent No.: US 8,185,550 B1
(45) Date of Patent: May 22, 2012

(54) SYSTEMS AND METHODS FOR EVENT-BASED PROVISIONING OF ELEVATED SYSTEM PRIVILEGES

(75) Inventors: Ronnie Allen Eichler, San Antonio, TX (US); Nathan Zane Kilpatrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 695 days.

(21) Appl. No.: 12/245,848

(22) Filed: Oct. 6, 2008

(51) Int. Cl.
   *G06F 17/30* (2006.01)
(52) U.S. Cl. ........... 707/783; 707/803; 709/224; 726/28
(58) Field of Classification Search .................. 707/802, 707/803, 661, 783; 709/224; 726/28
   See application file for complete search history.

(56) References Cited

U.S. PATENT DOCUMENTS

| | | | |
|---|---|---|---|
| 6,026,500 A | 2/2000 | Topff et al. | |
| 6,389,426 B1* | 5/2002 | Turnbull et al. | 707/661 |
| 6,763,333 B2* | 7/2004 | Jones et al. | 705/7.15 |
| 6,957,257 B1* | 10/2005 | Buffalo et al. | 709/224 |
| 7,266,734 B2* | 9/2007 | Chavez et al. | 714/48 |
| 7,357,301 B1* | 4/2008 | Bajpay et al. | 235/376 |
| 7,493,518 B2* | 2/2009 | Anderson et al. | 714/26 |
| 7,818,631 B1* | 10/2010 | Halikhedkar et al. | 714/48 |
| 7,826,443 B1* | 11/2010 | Rahman | 370/353 |
| 2003/0140031 A1 | 7/2003 | Thomas et al. | |
| 2003/0154118 A1 | 8/2003 | Druyan et al. | |
| 2004/0042589 A1 | 3/2004 | Grooms | |
| 2005/0131943 A1* | 6/2005 | Lewis et al. | 707/803 |
| 2006/0224623 A1 | 10/2006 | Graziadio et al. | |
| 2007/0005801 A1 | 1/2007 | Kumar et al. | |
| 2007/0283012 A1* | 12/2007 | Chu et al. | 709/225 |
| 2008/0108333 A1 | 5/2008 | Jemison et al. | |
| 2008/0148339 A1 | 6/2008 | Hill et al. | |
| 2010/0013607 A1 | 1/2010 | Sabo et al. | |

OTHER PUBLICATIONS

"Memorandum of Understanding LACNIC (the Latin America and Caribbean Network Information Centre, referred to here as "LACNIC") and Internet Systems Consortium, Inc. (referred to here as "ISC")", www.lacnic.net/docs/acuerdos/MoU-ISC.pdf, Apr. 1, 2004, 4 pgs.

* cited by examiner

*Primary Examiner* — Shahid Alam
(74) *Attorney, Agent, or Firm* — Brooks, Cameron & Huebsch, PLLC

(57) ABSTRACT

Methods and systems for providing elevated system access to users based on an alert from a monitoring tool or a request for change (RFC). Using the alert or RFC information, a provisioning server may reference the name of an impacted system against a database of privileges needed to allow elevated access to that system. The provisioning server may then initiate a task to provision a user's existing ID or a new ID with the necessary elevated privileges. Once the person closes the alert or RFC, the provisioning server may then remove access for that person, thus providing indirect and temporary access to a company's IT infrastructure and business applications without the use of a group ID or other mechanism to affect repairs on the impacted system(s).

18 Claims, 6 Drawing Sheets

SYSTEMS AND METHODS FOR EVENT-BASED PROVISIONING OF ELEVATED SYSTEM PRIVILEGES

CROSS-REFERENCE TO RELATED APPLICATIONS

This application is related in subject matter to, and incorporates herein by reference in its entirety, each of the following: U.S. patent application entitled "Systems and Methods for Event-Based Provisioning of Elevated System Privileges," Ser. No. 12/245,844, filed on even date; and U.S. patent application entitled "Systems and Methods for Event-Based Provisioning of Elevated System Privileges," Ser. No. 12/245,846, also filed on even date.

BACKGROUND

Companies often engage the services of third-party contractors to fill their IT (information technology) and technical support needs. This use of outside technical support personnel may be necessitated by a number of reasons, including restrictions on new hires within a company, a specific efficiency or technical expertise of the outside personnel, inconvenient or undesirable working hours (e.g., evening or holiday shifts), and the like.

To perform their services, however, the outside technical support personnel are typically granted elevated access privileges to the company's IT infrastructure and business applications, including computer systems, networks, programs, and the like. Unfortunately, granting outside technical support personnel access to a company's IT infrastructure and business applications can create a number of risks, such as lost and/or stolen data, unauthorized access to critical and/or highly sensitive systems, and the like. Indeed, many of the same risks may exist to some degree even with the company's own internal technical support personnel.

SUMMARY

Methods and systems for providing elevated system access to users based on an event within a computing infrastructure. Using information associated with the event, a provisioning server may reference the name of an impacted system against a database of privileges needed to allow elevated access to that system. The provisioning server may then initiate a task to provision a user's existing ID or a new ID with the necessary elevated privileges. Depending on a severity of the event, the task may be initiated automatically through a "push" process, or in a queued, "pull" fashion. After the event has been handled, or upon expiration of a maintenance window, the provisioning server may then remove access for that person's user ID, thus providing indirect and temporary access to a company's IT infrastructure and business applications without the use of a group ID or other mechanism to affect repairs on the impacted system(s).

The foregoing is a summary and thus contains, by necessity, simplifications, generalizations, and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred implementations, is better understood when read in conjunction with the appended drawings. For the purposes of illustration, there is shown in the drawings exemplary implementations; however, the present disclosure is not limited to the specific methods and instrumentalities disclosed. In the drawings.

DETAILED DESCRIPTION

The drawings described above and the written description of specific structures and functions below are not presented to limit the scope of what has been invented or the scope of the appended claims. Rather, the drawings and written description are provided to teach any person skilled in the art to make and use the innovations for which patent protection is sought. Those skilled in the art will appreciate that not all features of a commercial implementation of the innovations are described or shown for the sake of clarity and understanding.

As will be described in detail below, elevated system access may be provided to users based on an input set (e.g., an alert from a monitoring tool or a request for change (RFC)). Using alert or RFC information (e.g., an impacted system and person assigned), a provisioning server may reference the name of the impacted system against a database of privileges needed to allow elevated access to that system. The provisioning server may then initiate a task to provision a user's existing ID or a new ID with the necessary elevated privileges. Once the person closes the alert or RFC, the provisioning server may then remove access for that user ID.

Figure 1:
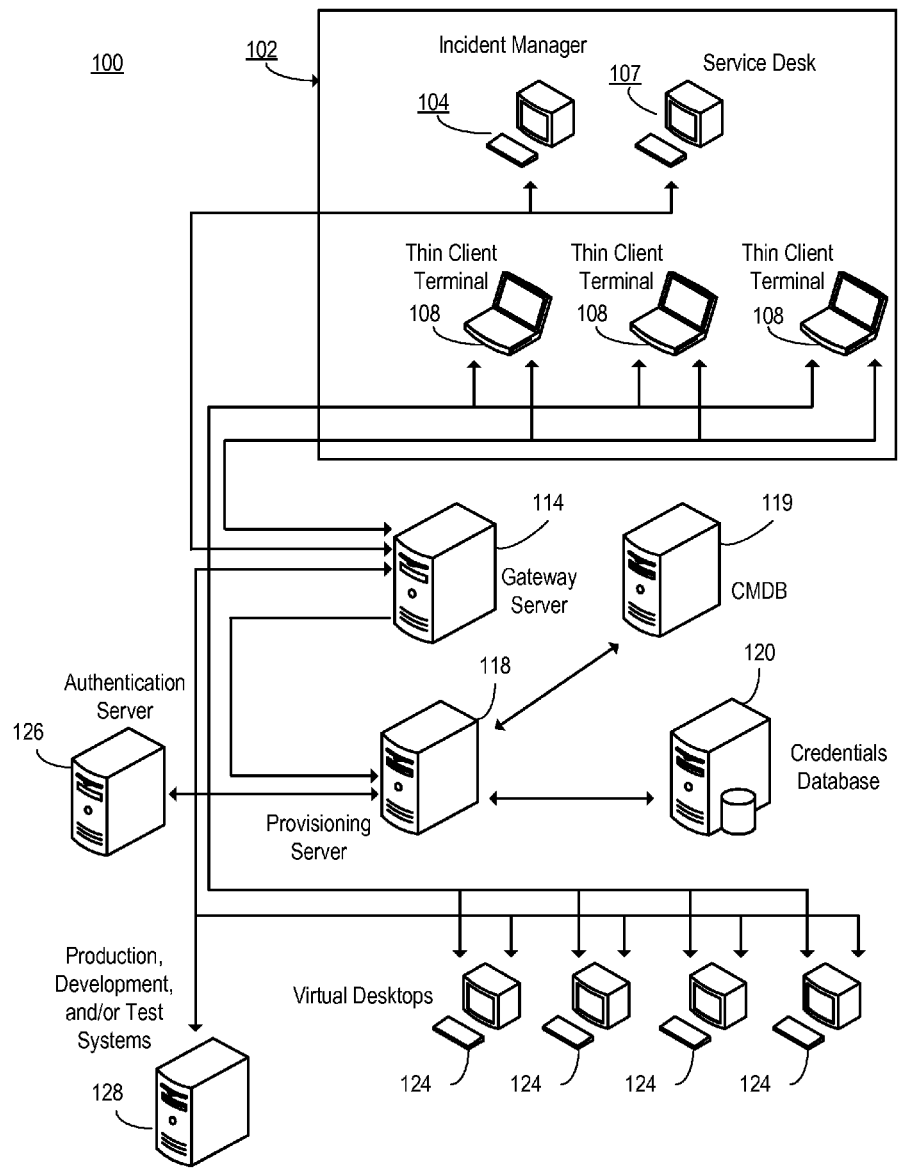
FIG. 1 is an exemplary infrastructure capable of being used to control access to a company's IT infrastructure.

Turning now to FIG. 1, an exemplary infrastructure 100 is shown that is capable of being used to control access to a company's IT infrastructure and business applications, including computer systems, networks, and software programs. The infrastructure 100 may be used to limit or control access by granting to the third-party technical support personnel only indirect and temporary access to the computer systems, networks, and software applications. Where applicable, the infrastructure 100 may also be used to limit access by the company's own internal technical support personnel. Accordingly, all third-party as well as internal company technical support personnel are henceforth referred to herein simply as "technical support personnel."

In some implementations, the exemplary infrastructure 100 may include an area called an access control center (ACC) 102 from which access to the company's IT infrastructure and business applications may be controlled. Such an ACC 102 may be, for example, a secure room or other enclosed area within the company where the technical support personnel may enter in order to access to the company's IT infrastructure and business applications. Physical entry to the ACC 102 may then be restricted using available security measures, including badges, key cards, bio scans, and the like. However, such physical security measures may not be needed if the identities of the technical support personnel are verifiable in other ways, for example, through user IDs, passwords, access codes, and the like. These latter forms of verification are particularly useful where the ACC 102 is located at a remote or offsite location, for example, another city, state, or country, where it may be difficult for the company to implement and maintain control over physical security measures.

Within the ACC 102, a plurality of computing terminals may be provided, including one or more incident manager terminals 104, service desk terminals 107, and thin client terminals 108. The term "incident" is used herein to refer to any IT event or condition, unexpected or otherwise, that may adversely impact an important operation of the company and therefore requires immediate resolution by the technical support personnel. Such an incident typically includes major malfunctions, for example, a suddenly slow or unresponsive Web site, dropped network connections, loss of access to databases, and the like. However, an incident may also include minor operational glitches that, while not requiring immediate resolution, still need to be resolved at some point. Thus, as used herein, an "incident" may include any IT event or condition, whether major or minor, that requires the attention of the technical support personnel.

Figure 6:
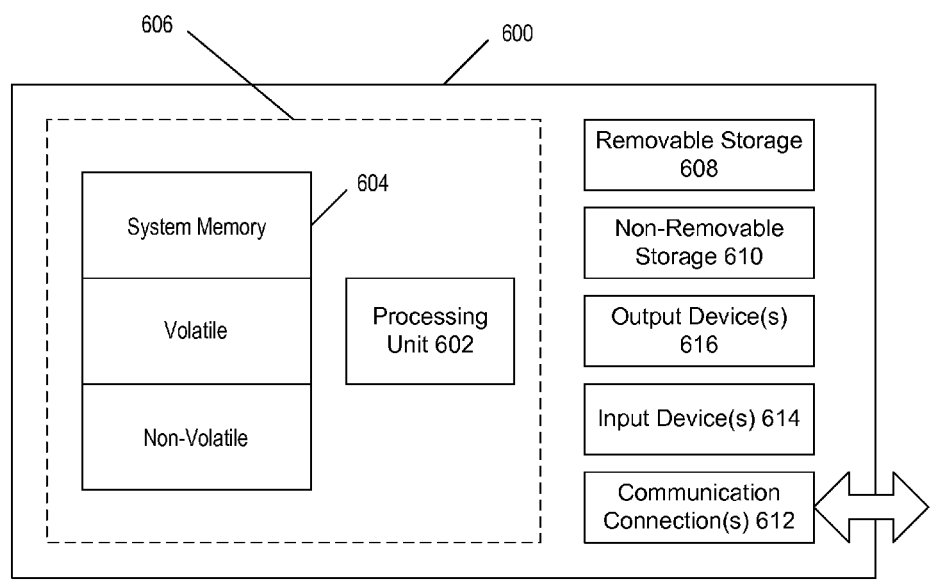
FIG. 6 shows an exemplary computing environment in which example implementations and aspects may be implemented.

Referring to the incident manager terminals 104, these terminals may be used by authorized individuals referred to herein as "incident managers" to manage the technical support personnel of the ACC 102. The incident managers generally are responsible for receiving notice of an incident, gathering any information needed about the incident, then assigning the appropriate technical support personnel to work on the incident. To this end, the incident manager terminals 104 may be general purpose computers with full functionality (e.g., hard drives, CD-ROM drives, etc.) and a full set of the software applications used in the company (e.g., e-mail, word processor, database tools, spreadsheet, Web browser, etc.), as shown in FIG. 6. This allows the incident managers to perform their functions with maximum flexibility and functionality.

The service desk 107 involves provisioning of IT services and is typically the first contact a business user has with their IT services when something does not work as expected. The service desk 107 may provide a single point of contact for each business user. The service desk 107 may participate in incident control and communication. Some service desks provide a basic call logging function and escalate calls to more experienced and trained IT services staff, while others provide a greater business and technical knowledge with the ability to solve most incidents at the time that the business user reports them.

The thin client terminals 108 may be used by the technical support personnel as remote desktops to perform the actual work needed to resolve an incident. The thin client terminals 108 may be dedicated computers that have mainly Web browsing and remote desktop functionality. Such thin client terminals may be software-based thin clients, hardware-based thin clients, or a combination of both. Access to the company's IT infrastructure and business applications may then be provided through the thin client terminals 108 on a per-incident basis. In this way, the technical support personnel may still access the company's IT infrastructure and business applications, but with minimal risk to the security of the infrastructure and business applications.

A gateway server 114 may operate as a proxy between a provisioning server 118 and a credentials database 120. When technical support personnel are assigned to incidents, the provisioning server 118 may confirm the identities of the technical support personnel. The provisioning server 118 may perform this confirmation, for example, by communicating with an authentication server 126, which may be any suitable directory server (e.g., Microsoft Active Directory), to obtain verification of the identities of the technical support personnel.

Similarly, when user IDs, passwords, or other credentials for the company's IT infrastructure and business applications are needed, the provisioning server 118 may obtain these credentials from the credentials database 120. The provisioning server 118 may also provide or otherwise cause these credentials to be provided directly to the IT infrastructure and business applications so that no intervention by the technical support personnel is needed.

A configuration management database (CMDB) 119 may be provided as a repository of all information related to components within the infrastructure 100, or external to the infrastructure 100, but under supervision of the IT infrastructure. The CMDB 119 may be provided to store data relating to the organization's management of its IT services, including data that relates to the maintenance, movement, and incidents of each configuration item. The CMDB 119 is not limited to this type of data, but also may store additional information about other types of items on which the organization's IT Services depend, including hardware, software, personnel, and documentation. The CMDB 119 includes the ability to trend incidents and/or to see what the impacts are from certain changes.

Access to the company's IT infrastructure and business applications may be provided through the virtual desktops 124. Such virtual desktops 124 may be implemented using any suitable computing systems that are capable of supporting one or more virtual terminals, for example, one or more Windows™, Unix™, or Linux™ workstations, servers, or other similar computing systems. These virtual desktops 124 may then be used to open remote access sessions to the company's IT infrastructure and business applications, depicted in FIG. 1 as one or more production, development, and/or test systems 128. As used herein, a production system is a system or application that has already been released and is fully operational and accessible by its intended users. A development system is a system or application that is currently undergoing development and design.

In some implementations, the technical support personnel may not be allowed to acquire or otherwise know the user IDs, passwords, and other credentials being used to access the production, development, and/or test systems 128 by other users, systems or administrative users (e.g., root). Instead, the user IDs associated with each of the technical support personnel may be temporarily granted a set of privileges and/or access rights to systems impacted by an incident based on a determination of the impacted system and the privileges/access necessary to correct the impacted system. A user ID associated with one of the technical support personnel may be granted elevated privileges by the provisioning server 118 in accordance with information in the credentials database 120 and CMDB 119. In some implementations, a new user ID may be created having the elevated privileges. The new user ID may exist for only as long as the ticket referencing the incident is open, after which the new user ID would no longer be valid or have the access privileges revoked.

In general operation, after being assigned to work on a given incident by an incident manager, one of the technical support personnel may use his/her thin client terminal 108 to access a particular production, development, and/or test system 128 through a virtual desktop 124. The technical support person may then perform, through the thin client terminal 108 and the virtual desktop 124, various tasks needed on the production, development, and/or test system 128 to resolve the incident.

Note in the foregoing that, while a single technical support person may be assigned to any given incident, it is also possible for multiple technical support personnel to be assigned to the same incident so that more than one technical support personnel may be given access to the same production, development, and/or test system 128 (albeit through different thin client terminals 108 and virtual desktops 124). One or more databases may then be set up to record and track which user IDs and passwords are being used by which technical support personnel on which production, development, and/or test system 128 for which incidents and so forth.

Figure 2:
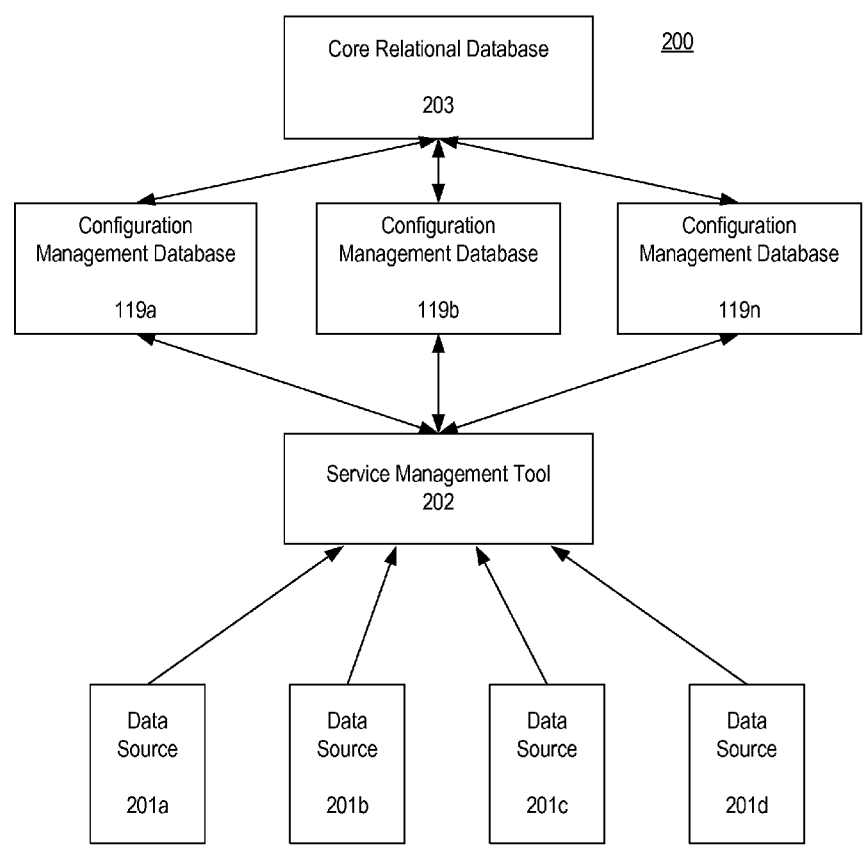
FIG. 2 provides a block diagram of a configuration management database and its related elements.

FIG. 2 provides a block diagram of the CMDB 119 and its related elements in a computer network 200. As shown in FIG. 2, computer network 200 includes one or more data sources 201*a*, 201*b*, 201*c* and 201*d*. Data sources 201*a*, 201*b*, 201*c* and 201*d* may include configuration items, like software applications, hardware, personnel information, servers, network nodes, databases, third party vendor connections, and file shares for critical documentation, as well as any other elements whose characteristics may be quantified on computer network 200. The data sources 201 may be in communication with a service management tool 202. One or more CMDBs 119*a*, 119*b* . . . 119*n* may be in communication with the service management tool 202. Also, the CMDBs 119*a*, 119*b* . . . 119*n* may be in communication with a core relational database 203. The core relational database 203 may be a database structure that is customized to the particular operation of the business. Core relational database 203 may include various attributes of data sources 201.

The core relational database 203 also may serve as a repository for interrelationships among the data sources 201*a*, 201*b*, 201*c* and 201*d*. These interrelationships may be assigned manually or automatically, using network-aware devices that determine relationships based on communication and interaction between the data sources 201*a*, 201*b*, 201*c* and 201*d*. In addition, these relationships among the various components of computer network 200 may be established using existing processes.

Also, information about the data sources 201*a*, 201*b*, 201*c* and 201*d* may be provided to core relational database 203 from the data sources themselves. For example, data source 201*a* may indicate to core relational database 203 such information, for example, as the number of processors on a particular computer terminal or server, the type of such processors, and the number and type of databases that are on a particular database server. Also, information may be obtained with regard to software applications on a computer terminal or server. In the examples, core relational database 203 manages the interrelations of data sources 201 among each other and with CMDBs 119*a*, 119*b* . . . 119*n* may be, for example.

The core relational database 203 also may function to take the various components of the configuration infrastructure and manage relationships with those components as they relate to actual and identified business processes dictated by the business practice. Also, core relational database 203 may be able to use existing processes and configuration item characteristics to aggregate existing repositories of information held in independent data sources. As a result of core relational database 203, configuration management and the other components of an ITIL framework may be capable of identifying an impact of a particular modification, change or addition of a configurable item down to the level of a business process.

Figure 3:
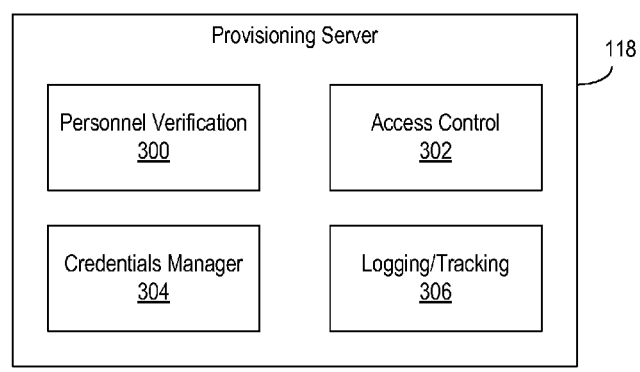
FIG. 3 illustrates an exemplary provisioning server.

FIG. 3 illustrates the provisioning server 118 in greater detail. The provisioning server 118 may be composed of a number of functional components, including a verification module 300, an access control module 302, a credentials manager 304, and a logging/tracking module 306. The verification module 300 may operate to verify the identity of the users who access components within the infrastructure 100. For example, after one of the technical support personnel has been identified to resolve an incident, the verification module 300 may connect to the authentication server 126 of the company and verify that the user ID and password are valid. If they are verified, then the technical support personnel will be allowed to proceed further.

The access control module 302 may operate to control access to the production, development, and/or test systems 128. For example, the access control module 302 may maintain a list access privileges assigned to certain user IDs and passwords for certain systems/components within the infrastructure 100. Varying levels of access may be maintained based on affected systems and in the incident.

The credentials manager 304 may operate to retrieve any user IDs, passwords, and other credentials needed to access the production, development, and/or test systems 128. The credentials manager 304 may perform this function by connecting to the credentials database 120 and looking up the credentials for the production, development, and/or test systems 128 to be accessed by the technical support personnel.

In some implementations, the access control module 302 and the credentials manager 304 may maintain a mapping of the user ID of the assigned technical support personnel with the access privileges necessary to affect repairs/corrections to components within the infrastructure 100 such that the assigned technical support personnel may initiate repairs on such affected systems/components. Such an arrangement hides the credentials from technical support personnel, and therefore, the likelihood of misuse is reduced.

The logging/tracking module 306 operates to record the activities of the technical support personnel on the thin client terminals 108, the virtual desktops 124, and the production, development, and/or test systems 128. In some implementations, the recording may be a full session capture of all activities carried out by the technical support personnel (e.g., keystroke logging, etc.).

Figure 4:
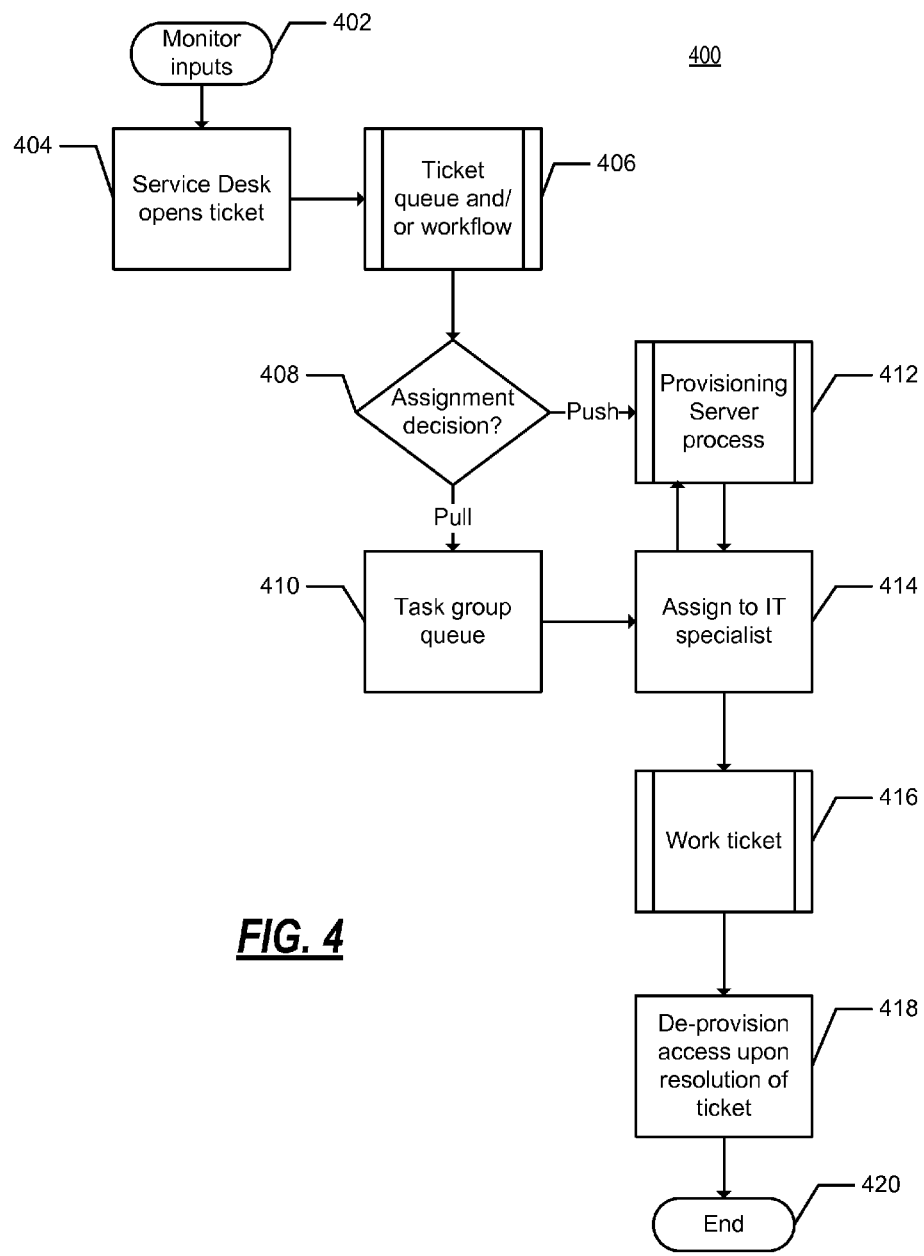
FIG. 4 is an exemplary operational flow diagram of a process to assign privileges to a user ID based on an incident.

FIG. 4 is an operational flow diagram of a process to assign privileges to a user ID based on an incident. At 402, one or more inputs are monitored. The inputs may be to the ACC 102 and may be one of several types, e.g., a system monitor detects a problem, an end-user notices a problem and notifies the service desk, preventative maintenance is identified and scheduled in advance, etc.

At 404, the service desk opens a ticket based on the input from 402. The ticket may be opened in a helpdesk/automation ticketing system, as is known in the art. This information may be entered manually, such as when an end-user calls the service desk, or entered automatically in the form of a trouble ticket based on a system monitor detecting a fault.

At 406, the ticket is entered into the system and the ticket queue and/or ticketing system operates to populate information into the ticket based on information received and external rules. For example, if a monitor detected a problem on a critical business service, the appropriate high severity is assigned to the ticket. Likewise, if a user called in to report a problem with his/her email, the appropriate systems could be identified by querying external sources to determine what possible systems could lead to the symptoms described. A lower severity will be assigned. Automatically populating this information helps to ensure that the ticket is properly routed to the individual/group that is responsible for return to service for the given problem.

At 408, a severity is determined based on the rules implemented at 406. A decision may be made to "push" or "pull" the ticket. For example, a ticket designated as high severity would be a "push." As such, in some implementations, it may be routed to a technical support person (i.e., resource) in the appropriate group for immediate resolution. This would be an available resource with the necessary expertise to correct the problem. Thus, the process for a "push" would continue at 412 where a provisioning server process is performed.

Figure 5:
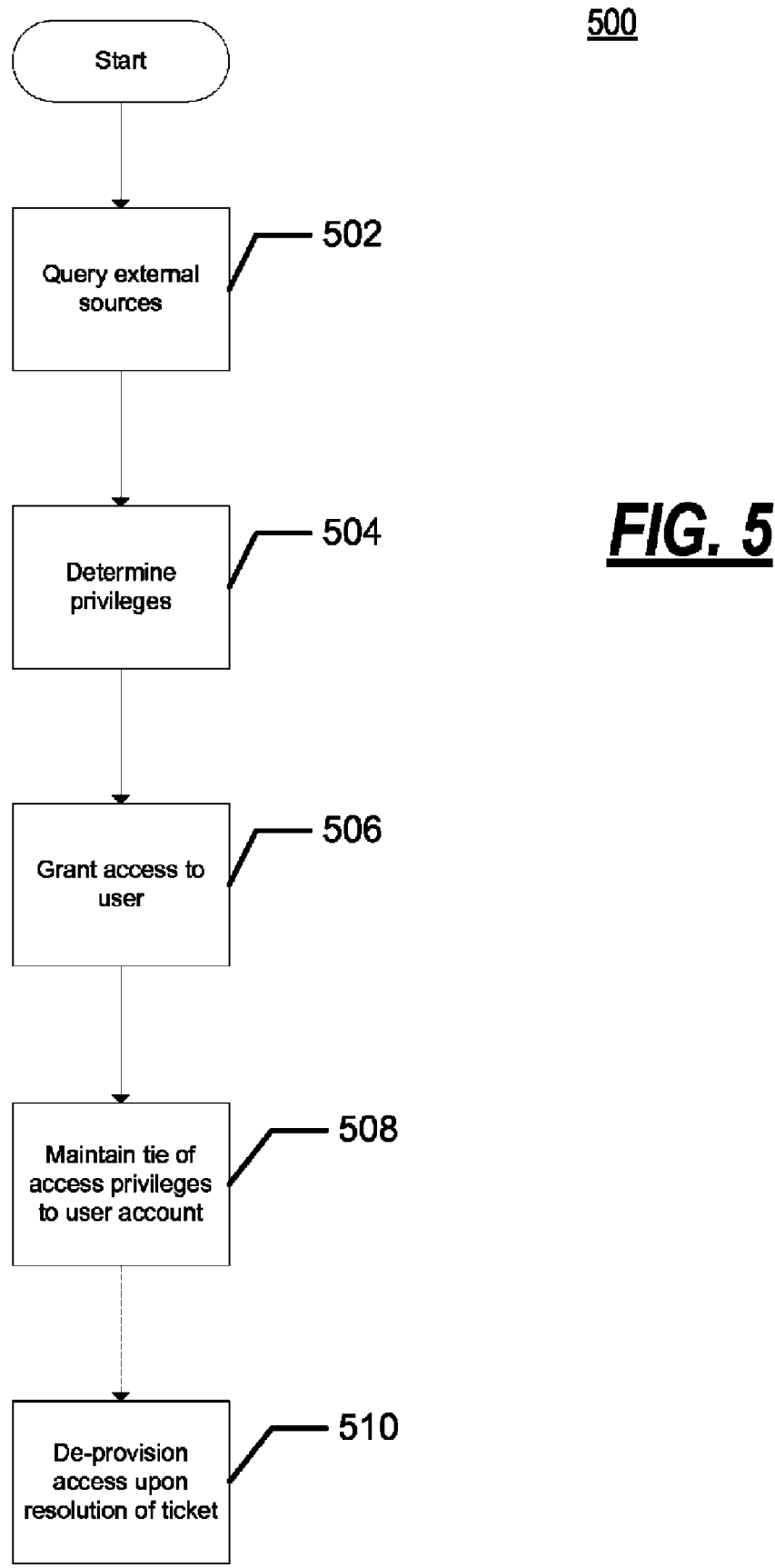
FIG. 5 illustrates an exemplary operational flow diagram of processes performed by the provisioning server.

FIG. 5 illustrates an operational flow diagram of processes performed at 412 by the provisioning server 118. As described above, the provisioning server 118 grants access to this resource's identity (i.e., the user ID) based on the impacted system noted in the ticket. At 502, the provisioning server 118 takes the systems noted in the ticket and queries external sources to determine (at 504) what privileges are needed for elevated access. For example, The CMDB 119 may be queried to determine what levels of access are needed to correct the symptoms noted on the impacted systems.

At 506, based on the systems and privileges identified, the provisioning server 118 grants access to the user ID of the resource to which the ticket is assigned. The provisioning server 118 may note all actions to grant access in the ticket for audit purposes. At 508, and throughout the process, access may be tied to a user's specific identity and not a shared account. In this way, it is easy to discern responsibility when reviewing log files or any audit trails. The need to share a group account is therefore avoided.

Referring again to FIG. 4, at 414, once access is provisioned, the user identified as being responsible is notified of the ticket. Based on the operation of the provisioning sever 118 at 412, the user now possess the needed privileges to work on the ticket at 416.

If at 408 the ticket is a low severity ticket it would be designated a "pull." At 410, the "pull" ticket may be dropped into a specified queue for the group responsible for the system. The ticket would then be worked based on resource availability. In this way, critical issues take priority over non-critical issues. Because the "pull" ticket is an action not designated as severe, this ticket may be worked by the next available resource at their earliest convenience within a given window. An example of this could be scheduled maintenance and other events of low impact. These tickets wait in a queue until picked up by the next available resource with access to the queue.

Typically, users assigned to a given queue are responsible for monitoring the queue and performing the work assigned to their queue. Thus, when a user decides to take responsibility for a ticket in the queue at 414, the provisioning server process (at 412) is executed to provide the user with the necessary elevated privileges to resolve the symptoms noted in the ticket. At 416, the user works on the trouble ticket.

At 418, in either scenario, the user either finishes the work and closes the ticket, or the maintenance window noted in the ticket expires. As such, access to the systems is de-provisioned based on information documented in the ticket by the provisioning server 118. For example, at 510, the provisioning server 118 may read the audit trail in the ticket and remove the elevated privileges assigned at 506.

FIG. 6 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and system memory 604. Depending on the exact configuration and type of computing device, system memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features and/or functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer-readable media. Computer-readable media can be any available media that can be accessed by computing device 600 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 604, removable storage 608, and non-removable storage 610 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may also contain communication connection(s) 612 that allow the computing device 600 to communicate with other devices. Communication connection(s) 612 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

Computing device 600 may be one of a plurality of computing devices 600 inter-connected by a network. As may be appreciated, the network may be any appropriate network, each computing device 600 may be connected thereto by way of communication connection(s) 612 in any appropriate manner, and each computing device 600 may communicate with one or more of the other computing devices 600 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computing system implemented method for provisioning access to technical support person to work a ticket in a computing infrastructure, wherein the computing system includes a processor and memory and executable instructions stored in memory and executable on the processor to perform the method, comprising:
   creating the ticket in accordance with information received regarding an incident and external rules;
   querying a configuration management database to determine privileges needed to access systems identified in the ticket;
   assigning the ticket to a technical support person, the technical support person being identified by a user ID;
   provisioning access privileges to the systems to the user ID;
   maintaining an association between the access privileges and the user ID;
   placing the ticket in a queue to be pulled by the technical support person identified by the user ID;
   querying a configuration management database to determine privileges needed to access systems affected by the incident; and
   provisioning the user ID with the levels of privileges on the systems affected by the incident.

2. The method of claim 1, further comprising:
   applying the external rules to determine a severity of the incident; and
   assigning the ticket by pushing the ticket to the technical support person identified by the user ID.

3. The method of claim 2, further comprising:
   querying a configuration management database to determine privileges needed to access systems affected by the incident; and
   automatically provisioning the user ID with the levels of privileges on the systems affected by the incident.

4. The method of claim 1, further comprising maintaining an association of the privileges with the user ID until the privileges are de-provisioned.

5. The method of claim 1, further comprising logging access to systems by the user ID while the user ID has the access privileges provisioned thereto.

6. The method of claim 1, further comprising de-provisioning the access privileges from the user ID in accordance with information contained in the ticket.

7. A non-transitory computer-readable medium comprising computer-readable instructions for provisioning access to technical support person to work a ticket in a computing infrastructure, comprising:
   creating the ticket in accordance with information received regarding an incident and external rules;
   querying a configuration management database to determine privileges needed to access systems identified in the ticket;
   assigning the ticket to a technical support person, the technical support person being identified by a user ID;
   provisioning access privileges to the systems to the user ID;
   maintaining an association between the access privileges and the user ID;
   placing the ticket in a queue to be pulled by the technical support person identified by the user ID;
   querying a configuration management database to determine privileges needed to access systems affected by the incident; and
   provisioning the user ID with the levels of privileges on the systems affected by the incident.

8. The computer-readable medium of claim 7, further comprising instructions for:
applying the external rules to determine a severity of the incident; and
assigning the ticket by pushing the ticket to the technical support person identified by the user ID.

9. The computer-readable medium of claim 8, further comprising instructions for:
querying a configuration management database to determine privileges needed to access systems affected by the incident; and
automatically provisioning the user ID with the levels of privileges on the systems affected by the incident.

10. The computer-readable medium of claim 7, further comprising instructions for maintaining an association of the privileges with the user ID until the privileges are de-provisioned.

11. The computer-readable medium of claim 7, further comprising instructions for logging access to systems by the user ID while the user ID has the access privileges provisioned thereto.

12. The computer-readable medium of claim 7, further comprising instructions for de-provisioning the access privileges from the user ID in accordance with information contained in the ticket.

13. A computing system having a processor and memory and a number of subsystems therein for provisioning access to technical support person to work a ticket in a computing infrastructure, comprising:
at least one subsystem that creates the ticket in accordance with information received regarding an incident and external rules;
at least one subsystem that queries a configuration management database to determine privileges needed to access systems identified in the ticket;
at least one subsystem that assigns the ticket to a technical support person, the technical support person being identified by a user ID;
at least one subsystem that provisions access privileges to the systems to the user ID;
at least one subsystem that maintains an association between the access privileges and the user ID;
placing the ticket in a queue to be pulled by the technical support person identified by the user ID;
querying a configuration management database to determine privileges needed to access systems affected by the incident; and
provisioning the user ID with the levels of privileges on the systems affected by the incident.

14. The system of claim 13, further comprising:
applying the external rules to determine a severity of the incident; and
assigning the ticket by pushing the ticket to the technical support person identified by the user ID.

15. The system of claim 14, further comprising:
at least one subsystem that queries a configuration management database to determine privileges needed to access systems affected by the incident; and
at least one subsystem that automatically provisions the user ID with the levels of privileges on the systems affected by the incident.

16. The system of claim 13, further comprising at least one subsystem that maintains an association of the privileges with the user ID until the privileges are de-provisioned.

17. The system of claim 13, further comprising at least one subsystem that logs access to systems by the user ID while the user ID has the access privileges provisioned thereto.

18. The system of claim 13, further comprising at least one subsystem that de-provisions the access privileges from the user ID in accordance with information contained in the ticket.

* * * * *